A. M. BATSNER.
CLUTCH CONTROL AND GEAR SHIFTING DEVICE.
APPLICATION FILED DEC. 11, 1916.

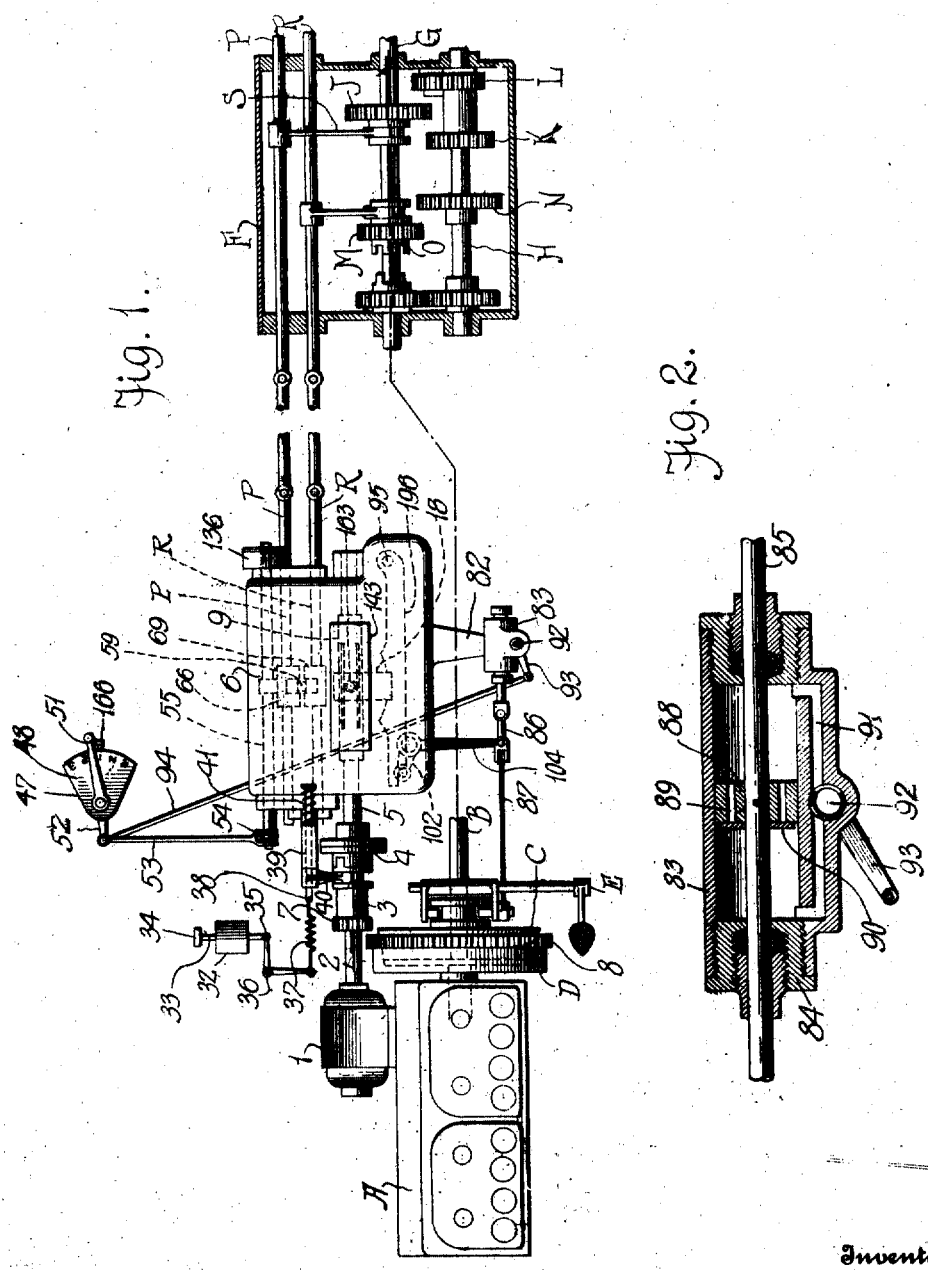

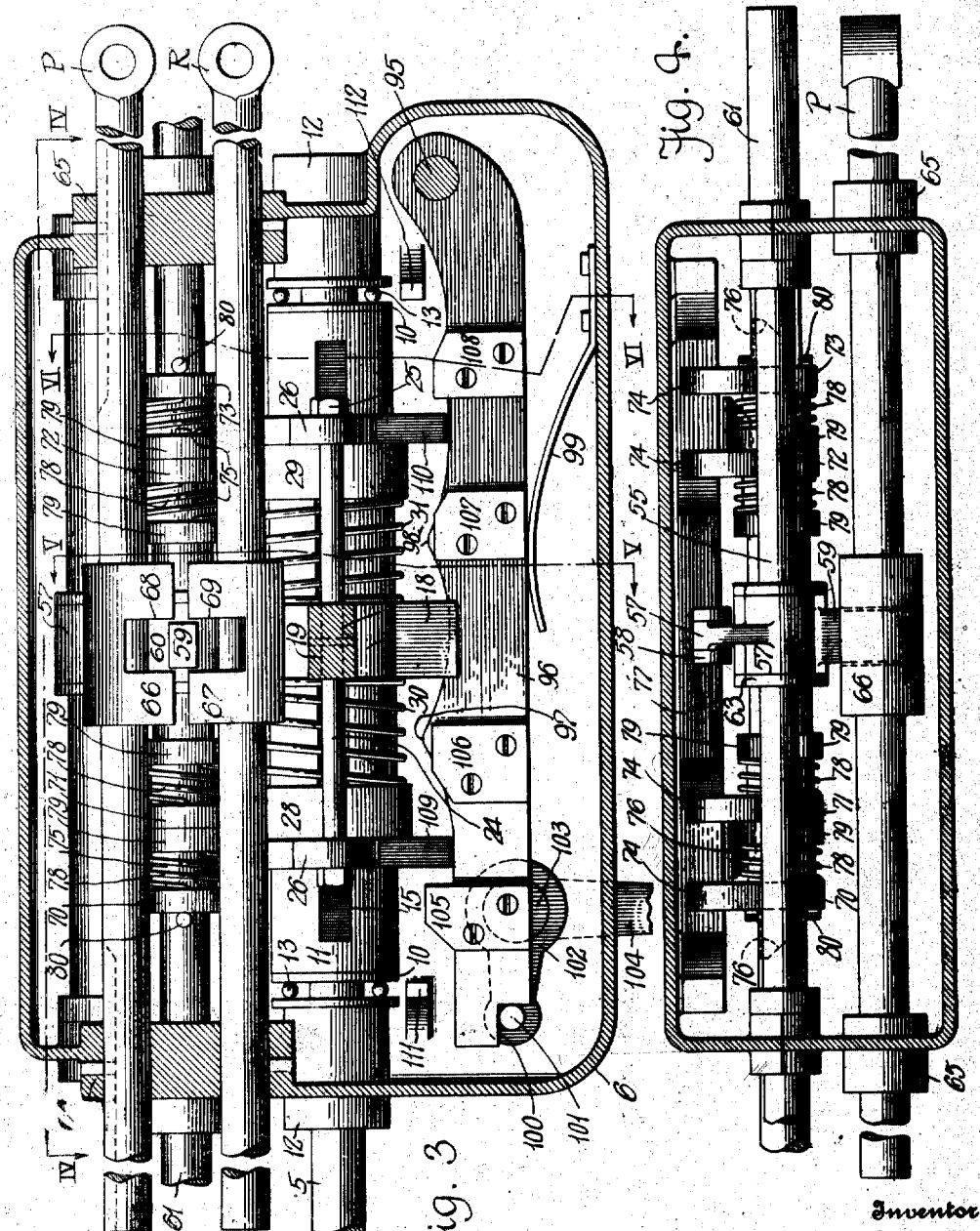

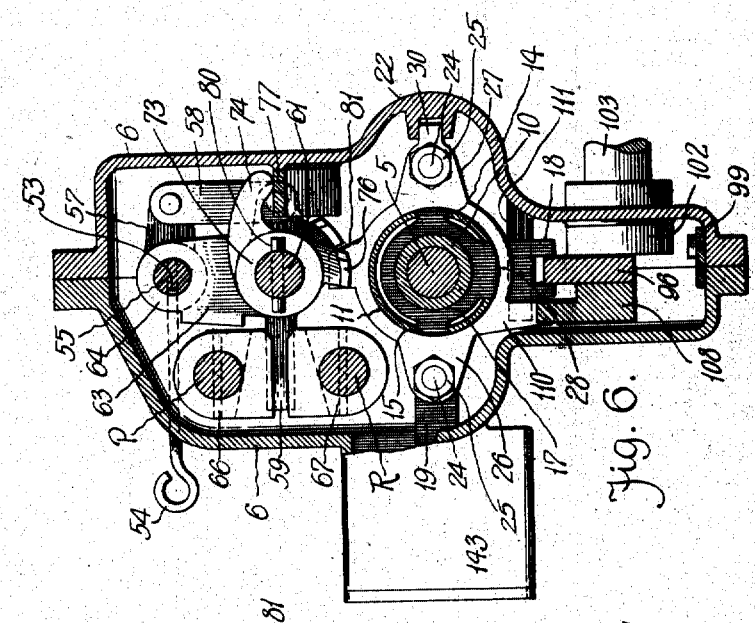

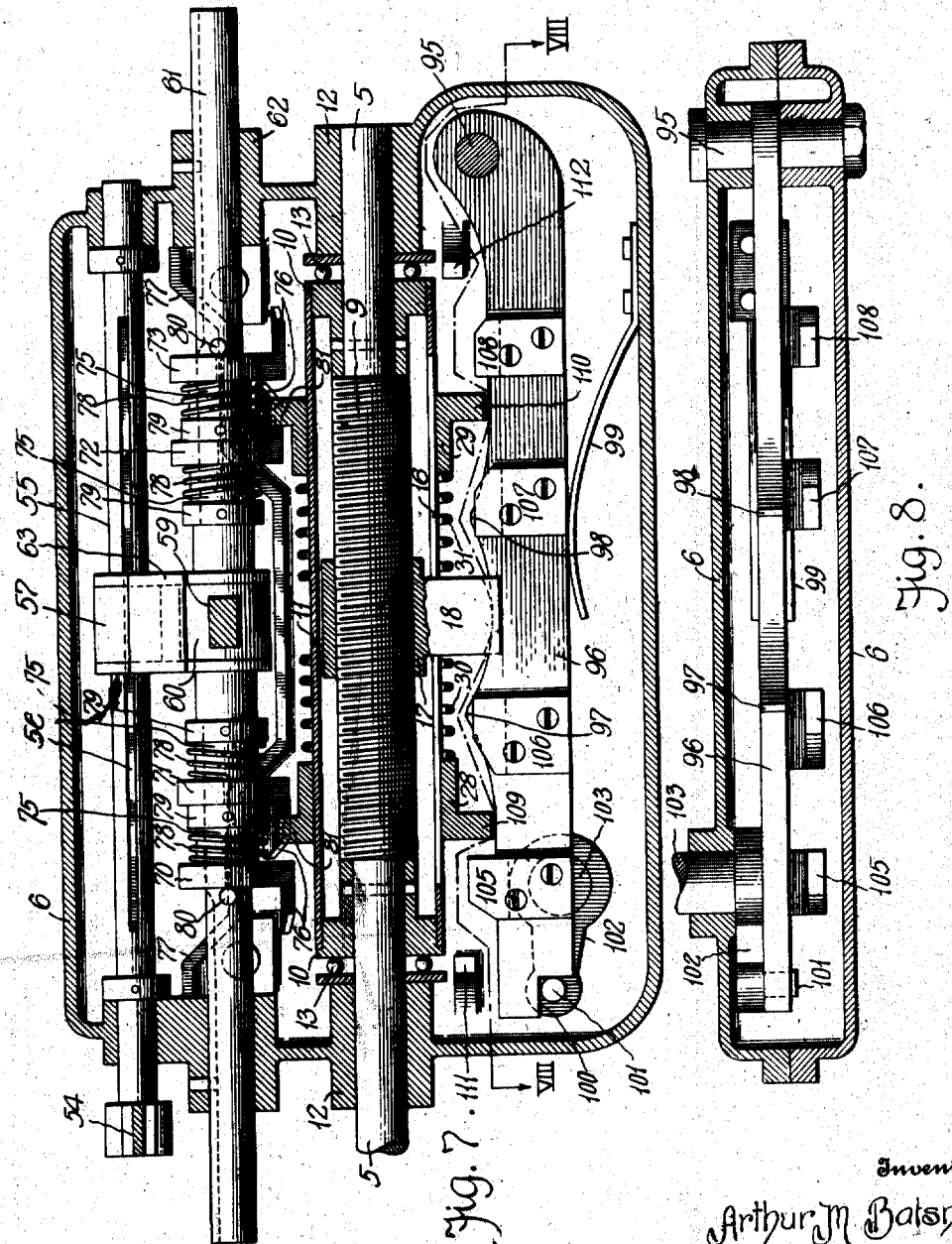

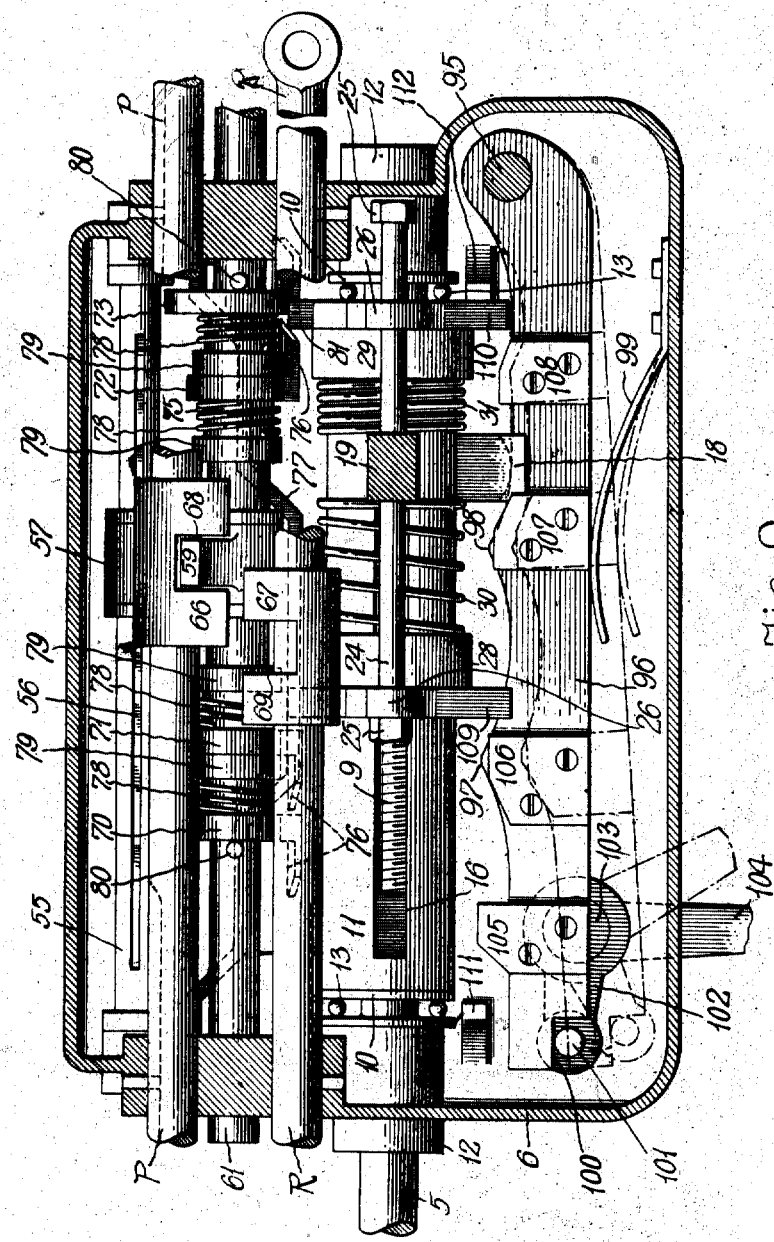

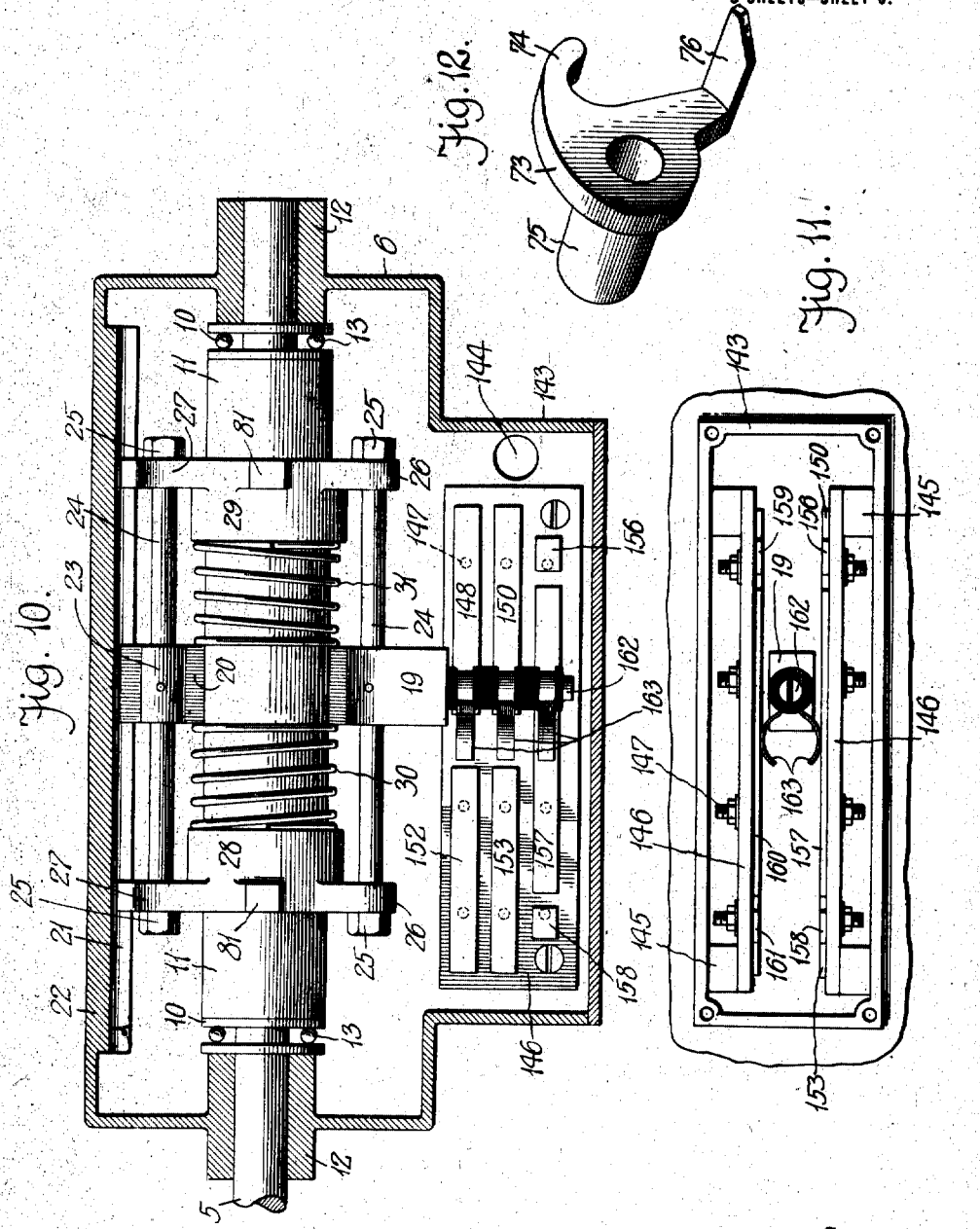

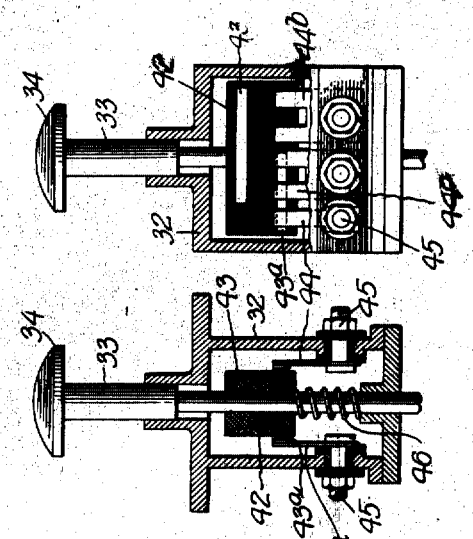

1,282,366.

Patented Oct. 22, 1918.
8 SHEETS—SHEET 8.

Witness
Chas. W. Stauffer
Karl H. Butler

Inventor
Arthur M. Batsner.
By Bartlett Cantly
Attorneys

UNITED STATES PATENT OFFICE.

ARTHUR M. BATSNER, OF CINCINNATI, OHIO, ASSIGNOR TO LALLEY ELECTRIC SHIFTER CO., OF DETROIT, MICHIGAN, A CORPORATION OF MICHIGAN.

CLUTCH CONTROL AND GEAR-SHIFTING DEVICE.

1,282,366.  Specification of Letters Patent.  Patented Oct. 22, 1918.

Application filed December 11, 1916. Serial No. 136,179.

*To all whom it may concern:*

Be it known that I, ARTHUR M. BATSNER, a citizen of the United States of America, residing at Cincinnati, in the county of Hamilton and State of Ohio, have invented certain new and useful Improvements in Clutch Control and Gear-Shifting Devices, of which the following is a specification, reference being had therein to the accompanying drawings.

This invention relates to clutch control and gear shifting apparatus adapted for association with the change speed gear transmission mechanism, engine, clutch and starter of a motor driven vehicle.

My invention aims to provide a gear shifting device for a change speed gear transmission mechanism wherein released expansive forces of mechanically and automatically tensioned or compressed members are utilized for quickly shifting a gear transmission mechanism, without racking and injury, and with such rapidity that meshing of the gears is assured and any retardation not perceptible. The tension or compression members by which these results are obtained are preferably in the form of springs, and my invention aims to provide positive and reliable means, as hereinafter set forth, for utilizing a starter,—electric or otherwise—as a prime mover to place the springs under compression.

My invention further aims to provide a gear shifting device in which members are automatically compressed while a clutch is being thrown out and automatically released when the clutch is completely disengaged to shift gears.

My invention still further aims to provide a combination of elements wherein gear shift members can be actuated by the expansive force of springs. The gear shift members have the usual selector arm which is manually placed in position for engagement with either member, and disposed to reciprocate the selector arm are oscillatory detents or gear position members automatically set for causing the springs to be compressed by the prime mover, so that when the detents or gear position members are automatically released at a predetermined time, the expansive force of one of the springs will quickly reciprocate the detent or gear position members and consequently move the selector arm to shift the gear member to the selected position. Provision is also made whereby the expansive force of the spring may be held in reserve to restore the selector arm to normal position, and the operation of the prime mover or starter motor for this purpose is automatically controlled by novel switches in circuit with the starter motor.

In the above organization there must naturally be mechanical and electrical controlling devices, and manual and automatic instrumentalities and the following may be mentioned since the distinct advantages are obtained by using the devices in connection with the gear shifting mechanism:

First, there is the combined starter and starter clutch control device for an electric starter motor, which is used as a prime mover. To use a starter motor for this purpose it is essential that some provision be made whereby the motor may be operated, at will, independent of the starting mechanism, and yet be associated with the starter mechanism when it is desired to start the engine of the motor vehicle. To accomplish this, I employ a novel treadle switch controlling the circuits of the starter motor and an engageable and disengageable connection between the armature shaft of the motor and the prime mover of the gear shifting device.

Second, there are gear and circuit selectors combined for installation on the steering post or point convenient to the chauffeur or operator of a motor vehicle. The selectors permit of gear positions being selected simultaneously with the establishment of electrical connections so that the operation of a master switch accomplishes a gear shift that may have been predetermined or set by the selector some time in advance of the actual shift.

Third, a clutch control is obtained by the selector devices through the medium of a dashpot especially designed to govern the driving connection between the engine shaft and the main gear transmission shaft, so that the clutch engages slowly for the first speed, faster at the second speed, and still faster for high speed. A clutch control is also used in connection with the prime mover in order that the clutch may be drawn out during certain operations of the prime mover and released to again establish a driving connection.

The principal elements of the invention—namely, a starter, prime mover, and automatic spring tensioning mechanism; starter switch and starter clutch control; gear selector device; oscillatory detents or gear position members; main clutch control by selector device; main clutch control by prime mover; circuit selector; auxiliary switch of the circuit selector; master switch, and cut-out or shunting switch will be hereinafter separately and specifically described in detail, together with the novel arrangement and objects accomplished by such a combination of devices and instrumentalities.

Reference will now be had to the drawings, wherein—

Figure 1 is a plan of the general arrangement of the gear shifting device relative to an engine, a starter, and a change speed gear transmission mechanism, which has been shown as partly in section;

Fig. 2 is a longitudinal sectional view of a dash-pot used in connection with the clutch control;

Fig. 3 is a horizontal sectional view, partly in plan, showing the mechanism of the gear shifting device in neutral position;

Fig. 4 is a longitudinal sectional view taken on the line IV—IV of Fig. 3, showing part of the mechanism in elevation;

Fig. 5 is a cross sectional view taken on the line V—V of Fig. 3;

Fig. 6 is a similar view taken on the line VI—VI of Fig. 3;

Fig. 7 is a horizontal sectional view taken on the line VII—VII of Fig. 5;

Fig. 8 is a longitudinal sectional view taken on the line VIII—VIII of Fig. 7;

Fig. 9 is a horizontal sectional view, partly in section showing the mechanism, in first speed and reverse position;

Fig. 10 is a longitudinal sectional view taken on the line X—X of Fig. 5;

Fig. 11, is a plan of the cut-out or shunting switch;

Fig. 12 is a perspective view of the detached detent or gear position member;

Fig. 13 is a plan of the combined gear and circuit selectors, partly broken away and partly in section;

Fig. 14 is a cross sectional view taken on the line XIV—XIV of Fig. 13;

Fig. 15 is a vertical sectional view of the starter switch;

Fig. 16 is a front elevation of the same partly broken away;

Fig. 17 is a cross sectional view of the auxiliary switch of the circuit selector, and Fig. 18 s a diagrammatic view illustrating the electrical connections of the gear shifting device.

Figure 18:
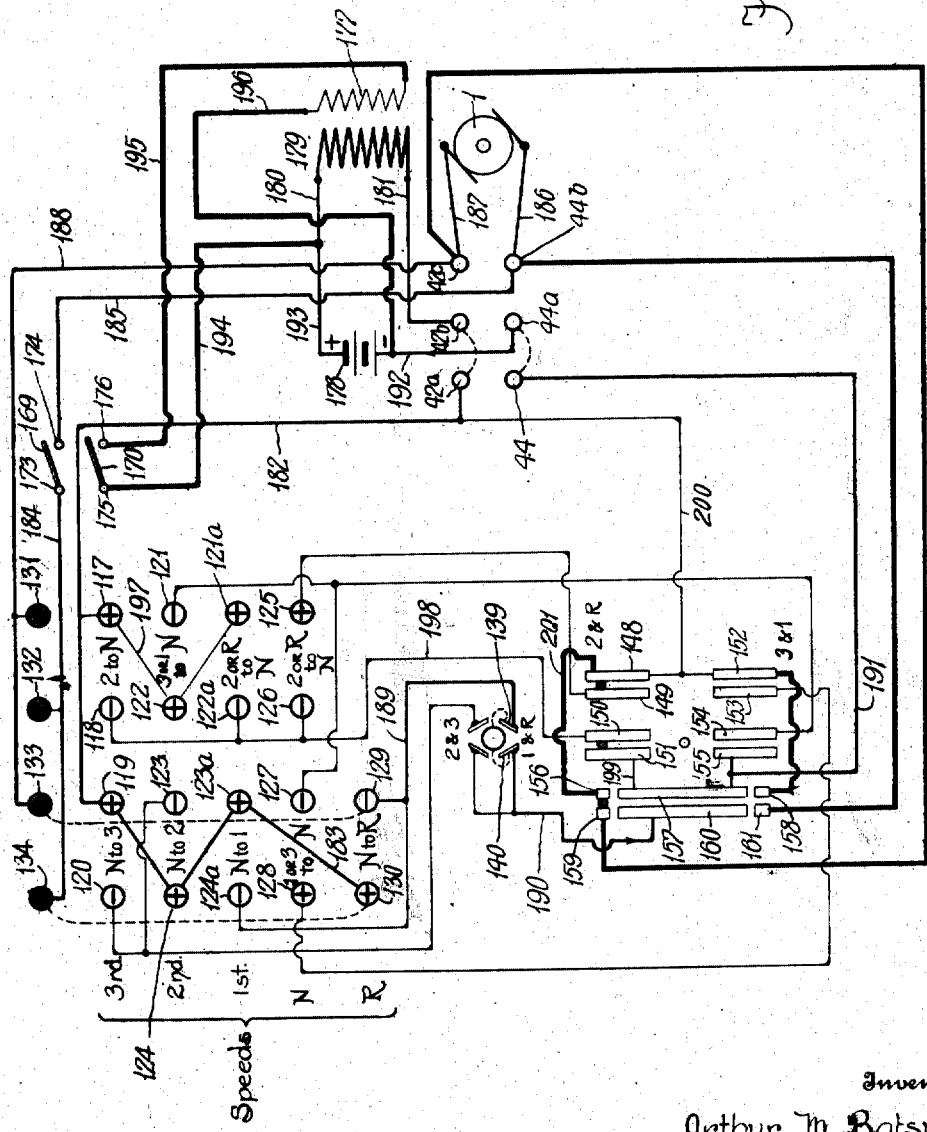

In describing my invention by aid of the views above referred to, I desire to point out that the same are intended as merely illustrative of the device as tried out and found satisfactory, and I do not care to confine my invention to the precise construction and arrangement of parts shown. The following description is therefore to be broadly construed as including such substitute constructions and arrangements of parts which are the obvious equivalent of those to be hereinafter referred to.

The general arrangement has been somewhat diagrammatically illustrated in Fig. 1, and a good idea of the combination or organization may be had when noting that the reference character A indicates a conventional form of internal combustion engine common to many motor driven vehicles. The driven shaft B of the engine has the usual clutch C adapted for engagement and disengagement with the fly wheel D of the engine A, the clutch member C being shifted into and out of engagement with the fly wheel D by the usual treadle action E. The engine shaft B is adapted to extend into the housing or casing F of a change speed gear transmission mechanism, said casing or housing containing the usual transmission shafts G and H, the former having a shiftable gear J adapted for meshing with gears K and L of the shaft H, said gears representing first speed and reverse. The shaft G has another shiftable gear M adapted to mesh with a second speed gear N on the shaft H and adapted to also establish third or high speed by the usual clutch members O. Extending through the casing or housing F are longitudinal reciprocable shifting rods P and R provided with forks S for shifting the gears M and J, and this type of change speed gear transmission mechanism is common in many motor driven vehicles.

The general view also shows my gear shifting device in conjunction with an electric starter for the engine A; a starter switch and starter clutch control; a combined gear and circuit selector; a clutch dash-pot controlling device, and an auxiliary switch of the circuit selector. These and other features of my invention will now be considered under their respective captions.

*Starter, prime mover, and automatic spring tensioning mechanism,*—(Figs. 1, 3, 5, 6, 7, and 9.)

The reference numeral 1 denotes a starter, as an electric motor, adjacent the engine A, and said starter motor has the armature shaft 2 thereof provided with a shiftable clutch member 3 adapted for engagement and disengagement with a clutch member 4 coupled to a worm or screw shaft 5, journaled in a casing generally denoted 6. The shiftable clutch member 3 has a small pinion 7 adapted to mesh with a circular rack or large gear 8 on the fly wheel D of the engine A, so that the crank shaft of the engine may be turned over by the starter motor for starting purposes.

The shaft 5, within the casing 6, has a screw or worm portion 9 and at the ends thereof are bearings 10 for a sleeve 11 loose on said bearings. Between the bearings 10 and shaft bearings 12 of the casing 6 are end thrust bearings 13, said end thrust bearings being of a conventional form. The sleeve 11 has top and bottom walls thereof provided with longitudinal slots 15 and 14 and a side wall of said sleeve has a longitudinal slot 16.

On the screw or worm 9 of the shaft 5 and within the sleeve 11 is a nut or traveler 17 adapted for reciprocation within the sleeve by rotation of the shaft 5. This nut has a lateral extension 18 protruding through the side slot 16 of the sleeve 11 to form part of the main clutch control by the prime mover, as will hereinafter appear. The nut 17 also has vertical extensions 19 and 20 protruding through the slots 15 and 14 respectively of the sleeve 11. The nut extension 20 may be considered as depending and extends into a channel guide 21 carried by an offset wall portion 22 of the bottom of the casing 6. The nut extensions 19 and 20 have barrel portions 23 in which are fixed longitudinal parallel guide rods 24 having the ends thereof provided with heads or tops 25. The rods 24 extend through apertured ears 26 and 27 carried by spring actuated members 28 and 29, and the apertured ears 27 have lug extensions 30 in the channel guide 21 so that the spring actuated members 28 and 29 cannot rotate but may reciprocate or rapidly shift on the sleeve 11 supporting said members. Encircling the sleeve 11, between the members 28 and the extensions 18, 19 and 20 of the nut 17, are coiled springs 30 and 31, the former being associated with the member 28 and the latter with the member 29. These springs are capable of being gradually placed under compression so that the expansive forces thereof may be utilized for quickly reciprocating or shifting the members 28 and 29 on the sleeve 11, and the nut 17, screw or worm 9, shaft 5 and starter motor 1 constitute electro-mechanical means for placing the springs under tension so that the expansive force of either may be used for gear shifting purposes. The members 28 and 29 are also employed for other adjustments that will appear under another caption.

*Starter switch and starter clutch control,* (Figs. 1, 15 and 16.)

It is now apparent that since the starter motor 1 is used as a spring tensioning means that provision must be made so as to disconnect the clutch member 3 relative to the member 4, to shift the clutch member 3 so that the pinion meshes with the rack 8, and then establish circuits whereby the motor 1 may be operated for starting the engine A.

This is accomplished by locating a treadle switch on the foot board of the motor vehicle or at some point convenient to the chauffeur or operator of the vehicle. The starter switch comprises a suitable casing 32 and extending therethrough is a vertical plunger 33 having the upper end thereof provided with a tread piece 34. The lower end of the plunger 33 is pivotally or loosely connected, as at 35, to a bell crank 36, and said bell crank is connected by a spring 37 to a clutch shifting rod 38. The rod 38 is slidable in a guide 39 carried by the casing 6 and said rod has a fixed fork 40 engaging the clutch member 3 to reciprocate the same on the armature shaft 2. On the rear end of the rod 38 is a spring 41 adapted to retract the rod 38 and place the clutch member 3 in engagement with the clutch member 4. When shifting the rod 38 in opposite direction the spring 37 will eventually pull the pinion 7 into mesh with the rack 8, particularly after the plunger 33 has been retracted and the teeth of the pinion and rack do not immediately mesh.

The plunger 33, within the casing 32, has a fixed insulator 42 for contact bars 43 and 43$^a$. These contact bars are adapted to be engaged by resilient contact fingers, one set being designated 44, 44$^a$ and 44$^b$, and another set 42$^a$, 42$^b$ and 42$^c$, carried by binding posts 45 of the casing 32, said binding posts being suitably insulated from said casing.

A coiled spring 46 encircles the plunger 33, between the bottom of the casing 32 and the insulator 42 and the expansive force of said spring is adapted to hold the insulator normally elevated with the contact fingers 42$^a$, 42$^b$ and 42$^c$ engaging the lowermost set of contact bars 43 carried by the insulator, to complete certain electric circuits that will permit of the starter motor 1 being used as a prime mover in connection with the gear shifting device, and break other circuits which will prevent the starter motor from being used in connection with the starting mechanism, until the plunger 33 is depressed. In other words, circuits are normally established in connection with the starter switch to permit of the same being used as a prime mover, and when the starter motor is to be used in connection with the starting mechanism, it is necessary for the chauffeur or operator of the vehicle to depress the plunger 33, thereby establishing operative electric circuits and throwing the clutch member 3 to enmesh the pinion 7 and the rack 8.

*Gear selector device,* (Figs. 1, 3, 5, 6, 7, 9 and 13.)

On the steering post of the motor vehicle or in proximity thereto is placed a sector shaped casing or box 47 having a detachable lid or cover 48. In the box 47 are suitable bearings 49, for a vertically disposed rotatable shaft 50 and the upper end of the shaft protrudes through the lid or cover 48 and is provided with a suitable operating crank or handle 51. The cover or lid 48 has the outer side thereof provided with suitable designations to indicate "reverse" "neutral," and "first," "second" and "third" speed positions so that the crank or handle 51 may be shifted over the cover 48 to a desired position. On the lower end of the rotatable shaft 50 is a crank 52 connected by a rod or link 53 to a resilient or flexible crank 54. The crank 54 is carried by the outer end of a rock shaft 55 journaled in the casing 6 and held against longitudinal displacement therein. The rock shaft 55, within the casing 6, has a longitudinal key or spline way 56, and slidable on said rock shaft and held to turn therewith by a key or spline extending into the way 56 is a crank 57. The lower end of the crank 57 is pivotally connected by links 58 to the lower end of a selector arm 59 which has a hub portion 60 loose on a reciprocable detent shaft 61 slidable in bearings 62 of the casing 6. To hold the selector arm 59 and the crank 57 in opposed relation and thus relieve the links 58 of lateral stresses or strains, a yoke 63 is employed, said yoke having side arms 64 loose on the shafts 55 and 61 at the sides of the crank 57 and the selector arm 59.

The shifting rods P and R or prolongations or extensions thereof are reciprocable in bearings 65 of the casing 6, and fixed on said rods, within the casing, are shifting members 66 and 67 having the confronting faces thereof provided with recesses 68 and 69 respectively. It is between the shifting members that the selector arm 59 extends, and the recesses 68 and 69 are shaped to receive the upper end of the selector arm when rocked on the detent shaft 61. With the selector arm 59 in the recess 68 of the member 66 the rod P can be reciprocated to obtain "first" speed or "reverse" position of the change speed gear transmission mechanism, or with the selector arm 59 in the recess 69 of the member 67 the rod R may be reciprocated for "second" and "third" speed positions. The manner of reciprocating the rods P and R will hereinafter appear, but this far it is to be noted that the matter of selecting one of the members 67 or 66 is manually accomplished by shifting the crank or handle 51. During such manual selection should the selector arm 59 fail to exactly register with one of the recesses 68 or 69 to move therein, the resilient crank 54 will forcibly hold the upper end of the selector arm against one of the faces of the members 66 or 67 so that immediately upon said member assuming a position to receive the selector arm, the selector arm will be shifted into the recess of the member by the resilient crank 54 assuming normal position. This is particularly true when shifting from "first" position to "second" position.

*Oscillatory detent or gear position members*
(Figs. 3, 4, 5, 6, 7, 9 and 12.)

Loose on the detent shaft 61 to oscillate thereon is a "first" and "third" speed position member 70 and in proximity thereto is a "neutral" member 71. These members are at one side of the selector arm 59 and at the opposite side thereof is another neutral member 72 and a "reverse" and "second" speed gear position member 73. The members 70 to 73 inclusive are practically identical in construction, and as clearly shown in Fig. 12, each member has a cam engaging lug 74, a hub portion 75, and a beveled detent 76. The cam engaging lug 74 is curved and tangentially disposed relative to the periphery of the gear position member, and the beveled detent 76 is carried by a crank portion of the member and disposed in parallelism with the longitudinal axis of the member. The cam engaging lugs 74 are normally held against a longitudinally disposed cam member 77 mounted on the bottom wall of the casing 6, as best shown in Figs. 6 and 7. This cam member has the ends thereof somewhat stepped so that each gear position members may be oscillated or turned on the detent shaft 61, and to hold the cam engaging lugs 74 normally against the cam member 77, the hub portions 75 of said members are encircled by coiled springs 78. One convolution of each spring is connected to a member and the other convolution is connected to a collar 79 fixed on the detent shaft 61, said collars coöperating with the pins 80 of the detent shaft in holding the gear position members against longitudinal displacement on said shaft.

The cam 77 is adapted to oscillate the members 70 to 73 inclusive and shift the detents 76 into and out of the paths of radial lugs 81 carried by the spring actuated members 28 and 29. The radial lugs 81 have the edges thereof beveled, also the detents 76 so that said detents may readily assume positions in front or behind of the lugs 81 as occasion requires during the operation of the gear shifting device. It is well to bear in mind at this point that the manual selection of the members 66 or 67 for a desired speed does not affect the position of the members 70 to 73 inclusive and that these members can be actuated by the cam 77 without disturbing the selector arm 59 relative to the members 66 or 67. Furthermore, that either of the members 70 to 73 inclusive may be shifted by one of the spring actuated members 28 or 29 to reciprocate the detent shaft 61 and thus cause the crank 57 and the yoke 63 to slide on the rock shaft 55.

*Main clutch control by selector device,* (Figs. 1 and 2.)

Supported from the casing 6 by a bracket 82 or from a suitable part of the vehicle frame is a dash-pot 83 having the ends thereof provided with stuffing boxes 84. Extending through the stuffing boxes and longitudinally of the dash-pot is a piston rod 85 connected by links 86 and 87 to the treadle action E of the clutch member C. On the piston rod 85 in the dash-pot 83 is a piston 88 having ports 89 controlled by a valvular member 90, as a flap valve.

The dash-pot body has a by-path 91 communicating with the ends of the body and intermediate the ends of the by-path 91 is a ported valve plug 92. A suitable liquid, as oil, is placed within the dash-pot to control the movement of the piston 88 therein, and the oil can freely pass through the ports 89 when the piston 88 is moved in one direction, while the passage of oil through the by-path 91, when the piston 88 is moved in the opposite direction, is controlled by the ported valve plug 92. This valve plug has a crank 93 connected by a rod 94 to the crank 52 of the shaft 50 forming part of the gear selector device previously described. The dash-pot 83 does not interfere with the operation of the clutch member C by the treadle action E, but it does control the operation of the clutch member C by the prime mover, and when the crank or handle 51 is shifted for a desired gear shift, the valve plug 92 is adjusted so that the dash-pot may freely act for "third" or "high" speed, since it is desirable to have a quick clutch action at said speeds. For "second" speed the action of the dash-pot is slightly retarded and so on to "reverse" position, at which time the by-path 91 is almost closed and thereby greatly retarding the action on the dash-pot causing a slow engagement of the clutch member C with the fly-wheel D.

*Clutch control by prime mover,* (Figs. 1, 3, 5, 6, 7, 8, and 9.)

A portion of the casing 6 is offset and pivoted in one end thereof by a pin 95 or other pivotal means is a lever 96. The lever 96 is arranged to swing in a lateral plane and the inner edge thereof has cam rises 97 and 98, while the outer edge thereof is engaged by a flat compression spring 99 connected to the inner wall of the casing 6. The spring 99 holds the lever 96 normally in the bifurcated end of the nut side extension 18, but permits of said lever yielding as the nut side extension 18 travels along the inner edge thereof. The free end of the lever 96 is notched, as at 100, to receive a crank pin 101 of a crank 102 carried by the inner end of the shaft 103, journaled in the casing 6. The shaft 103 extends out of the bottom of the casing and is provided with a long crank 104 which is connected to the link 86 so as to operate the treadle action E of the clutch member C. At two periods during the travel of the nut 17 the side extension 18 thereof shifts the lever 96 and causes the clutch member C to be drawn out, so that the gears may be shifted without any rattling or noise.

The lever 96 serves as a support for stops 105, 106, 107 and 108, all of said stops being beveled, and the stops 106 and 107 located at the cam rises 97 and 98 of the lever. The stops 105 and 106 are in the path of a finger 109 carried by the spring actuated member 28, and the stops 107 and 108 are in the path of a similar finger 110 carried by the spring actuated member 29. Besides these stops there is a stop 111 for the finger 109 and a stop 112 for the finger 110. The stops 111 and 112 are supported on the bottom wall of the casing 6.

The stops 105 to 108 inclusive, 111 and 112, have an important office in the operation of my device, and it might be well to briefly refer to the same now, so that in the general operation of the device the functions of the lever 96 will be better understood.

Referring to Figs. 3 and 9, it is apparent that when the nut or traveler 17 is moved to the right, that the finger 110 is carried into engagement with the stop 108 where it is held while the spring 31 is placed under compression by further movement of the nut 17. During the compression of the spring 31, the spring 30, member 28 and finger 109 are also shifted by reason of the rods 24 being carried by the nut 17 and the heads of said rods engaging the vertical extensions 19 and 20 of the member 28. When the spring 31 has been sufficiently compressed for the purposes for which it is intended, the side extension 18 of the nut 17 shifts the lever 96 and causes the stop 108 to be moved out of engagement with the finger 110, so that the spring 31 may forcibly shift the member 29 against the stop 112. It is the movement of the finger 110 from the stop 108 to the stop 112 that causes the lug 81 of the member 29 to shift the detent 76 which it engages and the gear position member of the detent, consequently the detent shaft 61 is quickly shifted and through the medium of the selector arm 59 one of the members 66 or 67 is moved, to shift a gear to a desired position.

When the nut 17 travels to the left the finger 109 is held by the stop 106 while the spring 30 is placed under compression and when the lever 96 is shifted to release the finger 109, said finger rapidly travels to the stop 105 and it is during the movement of the finger 109 from the stop 106 to 105 that the neutral member 71 is shifted to move the shaft 61 and restore the device to neutral position. Further travel of the nut 17 continues to compress the spring 30 so that when the stop 105 is moved out of engagement with the finger 109 the finger will be quickly shifted to the stop 111 and in so doing accomplish "first" or "third" speed positions.

In other words, the expansive force of the springs 30 and 31 could not be utilized for shifting purposes unless some means, such as just described, were employed for moving and releasing the spring actuated members 28 and 29 at predetermined times when the gear position members are correctly positioned to be actuated by the members 28 and 29.

It is also to be noted that there is a positive control of the main clutch by the lever 96 which also controls the use of an expansive force for shifting purposes, when the clutch is in position to prevent clashing of gears, and under the following captions will appear electrical features of the gear shifting device particularly controlling and governing instrumentalities for the prime mover.

*Circuit selector*, (Figs. 1, 13, 14 and 18.)

The curved wall of the box 47 of the gear selector device has apertured lugs 113 and connected to these lugs by screws 114 or other fastening means is a segment shaped vertically disposed support 115 having a plurality of binding posts 116 suitably insulated from the support 115 and provided with a series of contacts that are vertically disposed or arranged in rows, the first series being designated 117 to 120 inclusive; the next series designated 121 to 124 inclusive; the third series designated 121ª to 124ª inclusive; a fourth series designated 125 to 128 inclusive, and the remaining contacts designated 129 and 130. The contacts of each series are adapted to be simultaneously engaged by resilient contact fingers 131 to 134 inclusive carried by and suitably insulated from an arm 135 on the rotatable shaft 50 of the selector box, said arm being radially disposed, but at an angle relative to the crank or handle 51, so that the resilient contact fingers 131 to 134 inclusive may wipe and contact with a desired series of contacts.

Since the arm 135 is fixed to move in synchronism with the handle or crank 51, it is apparent that simultaneously with the selection of certain gear positions by the crank arm 51 that circuit selections are also made, and the principal purpose of the circuit selectors is to make certain electrical connections so that the starter motor 1 will be operated in a desired direction and thus cause the nut or traveler 17 to move in a direction for a desired gear position. This may be better understood by reference to the wiring diagram, Fig. 17, where it will be noted that the contact fingers 131 to 134 inclusive may engage a series of contacts 117 to 120, and by further movement of the arm 135 engage another series. For instance, when the contact fingers 131 to 134 inclusive engage the series of contacts 117 to 120 inclusive, there are two optional circuits for obtaining a gear shift of from "neutral" to "third" speed position, or from "second" speed position to "neutral" and in order that the proper circuits or contacts will be selected, there is an auxiliary switch actuated by the crank or handle 51, and other electrical contacts to be made which determines positively which of the circuits or set of contacts is to be used. This auxiliary switch will be considered under a separate caption.

While referring to this wiring diagram it is also to be noted that contacts 122ª and 121ª are used in circuits for "second" speed position or "reverse" to "neutral" and contacts 126 and 125 in circuits for "second" position or "reverse" to "neutral."

*Auxiliary switch of the circuit selector*, (Figs. 1 and 17.)

On an end wall of the casing 6 is a sector shaped switch casing 136 into which the rock shaft 55 extends and is provided with a radially disposed arm 137 having an insulated contact member 138. Mounted in the casing 136 and insulated therefrom are sets of blades disposed to receive the contact member 138, the blades of one set being designated 139 and 140 and the blades of the other set designated 141 and 142. The blades 139 and 140 are of less length than the blades 141 and 142 and are used in establishing circuits for "second" and "third" gear positions, while the long blades 141 and 142 are used in "first" and "reverse" gear positions.

This auxiliary switch is operated in synchronism with the gear and circuit selector with one exception, and that is when going from "first" to "second" position. Then the resilient crank 54 swings the contact member 138 from blades 141 and 142 to blades 139 and 140, and thereby automatically selects or completes a circuit. The establishment of a circuit by this auxiliary switch may lag after the selection of the circuit on account of the resilient or flexible crank 54 and this is desirable since the prime mover is not to be set in operation until the selector arm 59 is in positive engagement with one of the members 66 or 67.

*Cut out or shunting switch*, (Figs. 5, 10, 11 and 18.)

The top of the casing 6 has an oblong housing 143 in communication with said casing and above the prime mover therein. One of the side walls has an opening 144 for lead-in wires and both of the side walls are provided with inwardly projecting brackets 145 supporting longitudinal insulators or plates of insulation 146 in opposed relation. Connected to the insulators 146 by binding posts 147 are contact bars and the bars are arranged in sets with the bars 148 and 150 of one set opposing the bars 149 and 151 of another set. These bars longitudinally aline with other sets of bars designated 152, 154, 153 and 155, and in addition to these sets of contact bars, one insulator has three contact bars 156, 157 and 158 in opposed relation to contact bars 159, 160 and 161 carried by the other insulator. The vertical extension 19 of the nut or traveler 17 has a post 162 extending upwardly between the insulators 146, and mounted on said post and insulated therefrom and also from each other are resilient contact fingers 163 adapted to wipe the contact bars 148 to 161 inclusive. One set of contact fingers 163 may connect the bars 148 and 149 or 152 and 153, another set of contact fingers connect the bars 150 and 151 or bars 154 and 155, and the remaining set of contact fingers connect either the bars 156 and 159, bars 157 and 160, or bars 158 and 161. The switch just described cuts in and cuts out the starter motor at predetermined times, and shunts a circuit to provide a short circuit in connection with the motor armature, causing a brake action to quickly stop the motor. It also causes a reverse operation of the starter motor when proper circuits are established by the circuit selector.

*Master switch*, (Figs. 1, 13 and 14.)

The selector box 47 has a depressed portion serving as a housing 164 for the master switch, and slidable in the front wall of the housing 164 is a plunger 165. The outer end of the plunger has a button 166 and encircling said plunger between the front wall of the housing 164 and the button 166 is a coiled spring 167 holding the plunger 165 normally retracted or the switch open. The inner end of the plunger 165 has a vertically disposed cross head 168 of insulation material and suitably connected to the upper and lower ends of the cross head 168 are bridge pieces 169 and 170. In the housing 164 is an insulator or support of insulation material 171 provided with binding posts 172 supporting a set of contacts 173 and 174 adapted to be connected by the bridge piece 169, and another set of contacts 175 and 176 adapted to be connected by the bridge piece 170.

The master switch controls the operation of the starter motor 1 and also the completion of the shunt circuit in connection with a shunt coil 177 associated with a motor field 179, and as indicating a suitable source of electrical energy for the motor 101 there is shown, in Fig. 18, battery cells 178.

*General operation.*

The mechanism shown in Fig. 3 is in "neutral" position and since the mechanism has been illustrated in Fig. 9 as shifted for a "reverse" position, I will consider the operation which has taken place to accomplish this result.

When the handle or crank 51 is shifted to the left and to the designation "Reverse", the shaft 50, crank 52, rod 53, and resilient crank 54 turn the rock shaft 55 clockwise, and in so doing a similar movement is imparted to the hub portion 60 of the selector arm 59 through the medium of the crank 57 and the links 58. The selector arm 59 is therefore shifted into the recess 68 of the gear shift member 66, and the operator of the handle or crank 51 has now elected to reciprocate the rod P in one direction or the other.

As the operator intends to change speed by shifting transmission gears, it is necessary that the clutch member C be withdrawn or placed in such condition that it can be withdrawn, and this is accomplished by having the oil in the dashpot flow freely through the ports 89 of the piston 88. It is through the medium of the rod 94 that the valve in the dashpot by-path 91 is set to control the closing of the clutch for the next shift of gears. The shifting of the crank 51 to the "reverse" designation, also elects the "reverse" electrical connection, that is, contact fingers 133 and 134 are carried into engagement with contacts 129 and 130 respectively. Furthermore, in electing the "reverse" position, the shaft 55 which has been turned clockwise swings the contact member 138 between the blades 139 and 140, and in this manner the two switches have been prepared for certain circuits which will operate the prime mover in a desired direction when the change speed is to be effected. The operation or adjustment so far accomplished may remain dormant until the operator actually decides to shift the gear, at which time, the master switch is operated, thereby connecting or bridging contacts 173 and 174, and contacts 175 and 176. The starter motor 1 is placed in operation and the screw or worm portion 9 of the shaft 5 is revolved to feed the nut or traveler 17 to the right or toward the spring 31. When the nut or traveler starts to move a number of things are accomplished. First, the side extension 18 of the nut 17 ascending the rise 98 of the lever 96 forces the lever outwardly and through the medium of the crank 102 and shaft 103 the crank 104 withdraws the clutch member C. As this is taking place the spring 31 and the member 29 to be actuated thereby are shifted on the sleeve 11, and the finger 110 of the member 29 engages the stop 108 at the same time the lug 81 engages the detent 76 of the "reverse" position member 73. Just before the extension 18 of the nut 17 reaches the apex of the rise 98, the spring 31 is sufficiently compressed so that its expansive force, when released, is sufficient to forcibly shift the member 29. As soon as the lateral extension 18 reaches the apex of the rise 98, the stop 108 is shifted out of engagement with the finger 110, and the spring 31 is allowed to expand. It will be remembered that the lug of the member 29 is still in engagement with the detent of the "reverse" position member 73, consequently said member will reciprocate the detent shaft 61 to the right owing to the fact that the member 73 engages the pin 80 of said shaft.

During the movement of the member 73 by the member 29 the cam engaging lug 74 of the member 73 ascends the end of the cam 77 and at a predetermined time the detent 76 of the member 73 is kicked out of the path of the lug 81 thus causing a cessation in the movement of the detent shaft 61 and should the member 29 continue to move it eventually engages the stop 112. Now, since the selector arm 59 had been placed in engagement with the member 66, it is obvious that this member and the rod P will be shifted to the right, and by reference to Fig. 1, it will be noted that the gear J is moved into mesh with the reverse gear L. Then while the clutch member C is withdrawn and as the extension 18 descends from the rise 98, the spring 99 shifts the lever 96 to normal position and provides clearance for the crank pin 101 so that the usual spring associated with the clutch member C may throw the clutch in and thereby allow the engine A to propel the vehicle in a "reverse" position.

While this has been taking place, it is to be noted that through the medium of the rods 24 carried by the nut or traveler 17, the spring 30 and the member 28 have been carried along with the nut while compressing the spring 31, and when the lever 96 assumes normal position, the stop 106 is in position to be engaged by the finger 109 of the spring actuated member 28 and that the lug 81 of the member 28 is in position to engage the detent of the neutral member 71 when the direction of the prime mover is reversed and the nut or traveler 17 moves to the left. Such preparations are made so that the transmission gears may be shifted to "neutral" position before assuming any other position.

So far I have considered the mechanical operations of movements in going from "neutral" to "reverse". I will now go back to the closing of the master switch to consider the electrical operation.

In "neutral" position, the contact fingers 163 connect the contact bars 157 and 160 and as soon as the master switch is closed, the starter motor 1 is placed in operation to move the nut 17. By reference to the wiring diagram, it will be observed that the circuit for this purpose is as follows:—

Positive side of the source of electrical energy 178 by wire 180 to the motor field 179 and by wire 181 to contact finger 42$^b$. As the starter switch has not been disturbed, the bar 43$^a$ bridges the contact fingers 42$^a$ and 42$^b$ and the circuit continues by wire 182 to contact 119, by wires 183 to contacts 124, 123$^a$, 130, 117, 122 and 121$^a$. As the circuit selector has been previously actuated and contact fingers 134 and 133 placed in engagement with contacts 130 and 129, the circuit continues from contact fingers 134 by wire 184 to the master switch. From the master switch by wire 185 to contact finger 44$^b$. Then by wire 186 to the motor armature 1 and by wire 187 to contact finger 42$^c$. From this point the circuit continues by wire 188 to contact fingers 133 now in engagement with contact 129. From this last mentioned contact by wire 189 to the connected blades 139 and 140 of the auxiliary switch. From this auxiliary switch by wire 190 to the connected contact bars 157 and 160, by wire 191 to contact finger 44 which is connected to contact finger 44$^a$, and then by wire 192 to the negative side of the source of electrical energy 178.

As the nut or traveler 17 moves along, the contact fingers 163 maintain the circuit by which the gears are shifted;—it being understood that the master switch is held closed during such shifting.

When the contact fingers 163 reach the gap between the contact bars 160, 157 and 156, 159, the momentum of the motor armature 1 is sufficient to carry the contact fingers 163 between the contact bars 156 and 159, to short circuit the motor armature, but to stop the same a load is placed upon the motor armature by the shunt field 177, and this shunt field circuit was prepared when the master switch was closed. The short circuit through the contact bars 156 and 159 can be readily traced and the shunt circuit is as follows:—

From the positive side of the source of electrical energy 178 by wires 193 and 194 to contact 175 and bridge piece 170 to contact 176, by wire 195 to the shunt field 177 and by wire 196 to the negative side of the source of electrical energy 178. This shunt circuit serves as a brake for the starter motor and the prime mover remains in the "reverse" position shown in Fig. 9.

It is to be noted that when the prime mover ceases to operate that certain of the contact fingers 163 engage the contact bars 148 to 151 inclusive and with electrical connections established through the medium of the contact fingers 163, the next time the prime mover is placed in operation, the starter motor will be reversed, so as to carry the nut or traveler 17 to the left. Assuming that it is desired to bring the transmission gears to "neutral" position, I will first describe the electric circuit by which this is accomplished and then the mechanical movements in connection with the prime mover.

When the handle or crank 51 is shifted back two notches to the right, the contact fingers 131 and 132 engage the contacts 121$^a$ and 122$^a$, and assuming that the master switch has been closed, the "neutral" circuit is as follows:—

From the positive side of the electrical source of energy 178 by wires 193 and 180 to the motor field 179, wire 181 to contact finger 42$^b$, across the bar 43$^a$ to contact finger 42$^a$, by wire 182 to contact 117. From this contact to contact finger 131 and wires 188 and 187 to the starter motor 1. From the starter motor by wires 186 and 185 to the master switch and then by wire 184 to the contact finger 132. From contact finger 132 to contact 122$^a$, and then by wire 198 to contact bars 150 and 151. These bars are connected by a wire 199 to the contact bar 157, and said contact bar is connected by a wire 191 to the contact finger 44. From this contact finger to contact finger 44$^a$ and wire 192 to the negative side of the source of electrical energy 178.

Now consider the mechanical operations in going from "reverse" to "neutral". When selecting the above circuit to place the prime mover in operation, the selector arm 59 has been shifted against the gear shift member 67, but not completely out of engagement with the member 66. The resilient crank 54 has been flexed and the resiliency of said crank is sufficient to forcibly hold said selector arm 59 against the member 67 so that when the recess 69 of the member 67 is reached, the selector arm 59 will assume the "neutral" position shown in Fig. 3.

It is now well to bear in mind that when the prime mover ceased to operate at "reverse" position, the stop 106 was raised behind the finger 109 of the spring actuated member 28, and member 71 with its detent 76 in position to be engaged by the lug 81 of the spring actuated member 28. Now assuming that the nut or traveler 17 is moving to the left, the lever 96 is actuated to withdraw the clutch member C similar to the clutch actuation when going to "reverse" position. The finger 109 engages the stop 106; the lug 81 engages the detent 76 of the "neutral" position member 71, and the member 28 is held while the spring 30 is compressed by the nut or traveler 17. The lateral extension 18 of the lug 17 ascends the rise 97 of the lever 96 and said lever is shifted to move the stop 106 out of engagement with the finger 109, at which time the expansive force of the spring 30 shifts the member 28 and the "neutral" position member 71. Of course the detent rod 61, selector arm 59, gear shift member 66, rod P and gear J are moved, and when the selector arm 59 reaches the recess of the member 67, the resilient crank 54 shifts the selector arm 59 to normal position.

The finger 109 of the spring actuated member 28 is carried into engagement with the stop 105, and as the nut of traveler 17 continues to move to the left, the spring 30 is gradually placed under compression so that its expansive force may be utilized to shift the gears to "first" or "third" positions, just the same as the expansive force of the spring 31 was stored up at the end of the reverse operation to be used for the neutral operation just described.

As soon as the contact fingers 163 engage the contact bars 156 and 159, there is a short circuit for the armature of the motor, which is as follows:—

Positive side of the battery 178 by wires 193, 180 to motor field 179, by wire 181 to contact fingers 42$^b$, 42$^a$, wire 182 to contact 119; wires 183 through contacts 124, 123$^a$ to 130, then by contact finger 134 and wires 184, 185 to contact finger 44$^b$. This far the current has a tendency to enter the motor and operate the same in one direction, but by tracing the circuit through the motor it will be found to be an open circuit ending at contact bar 160. Now tracing the circuit again and starting in with contact finger 42$^a$, the circuit is by wire 200 to contact bar 148, wire 201 to contact bars 156, 159, and then by wire 202 to contact finger 42$^c$. The current thus attempts to enter the motor in an opposite direction from that at contact finger 44$^b$ and consequently there is a short circuit for the armature of the motor. As the shunt field circuit was established when closing the master switch there is a braking effect in connection with the motor that tends to stop the same.

The operations in obtaining other gear positions are about the same with the exception of going from "first" speed to "second" speed. Assuming that the gears are in "first" position, and that the handle or crank 51 is shifted with the "second" speed position, then the resilient crank 54 is flexed and the selector arm 59 held against the member 67 and the circuits selected include the short blades 139 and 140 of the auxiliary switch. As the prime mover travels toward "neutral" position, electrical connections are broken, but the momentum of the motor armature brings the nut or traveler 17 over its intermediate position, thus allowing the selector arm 59 to shift into the recess of the member 67. It is therefore apparent that when the selector arm is automatically shifted into the member 67 that the shaft 55 is rocked and the contact member 138 shifted from between the blades 140 and 142 to a position between the blades 139 and 140. In this manner a circuit is automatically established which permits of the prime mover driving the nut or traveler 17 to second position.

What I claim is:—

1. The combination of gear shifting members, spring actuated members for moving said gear shifting members, a selector for said spring actuated members, and a selector for said gear shifting members.

2. The combination of gear shifting members, compressible members adapted to have the expansive force thereof shift said members, an electrically operated reciprocable traveler to compress said members, and a selector for determining the direction of travel by said traveler and the member compressed thereby.

3. The combination of gear shifting members, compressible members adapted to have the expansive force thereof shift said members, a traveler adapted to compress said members, electric means for moving said traveler toward either member, and a combined selector for said gear shifting members and the direction of movement of said traveler by said electric means.

4. The combination of gear shifting members, compressible members adapted to have the expansive force thereof shift said members, a traveler between said members, means for moving said traveler to compress either member, and oscillatory means adapted to hold a member until compressed by said traveler.

5. The combination of gear shifting members, compressible members adapted to have the expansive force thereof shift said members, a selector for said gear shifting members, a traveler between said compressible members, means for moving said traveler to compress either member, a selector for said moving means and means for holding a member during compression by said traveler.

6. In a gear-shift operating device for transmission mechanism, the combination of means for setting and controlling the device, and a mechanical means for operating said device controlled by said last mentioned means.

7. Gear shifting means for automobiles, comprising gear shifting members, a selector for said members, a detent rod reciprocable with said members, detents supported from said rod, a spring actuated member adapted to engage and move said detents, and means adapted to shift said detent to release said spring actuated member relatively to said detent.

8. Gear shifting means for automobiles, comprising gear shifting members, a selector therefor, a rod reciprocable with said gear shifting members, spring actuated members, and means on said rod adapted to be positioned in the path of said spring actuated members so as to move said rod.

9. Gear shifting means for automobiles, comprising gear shifting members, a selector therefor, a rod reciprocable with said gear shifting members, spring actuated members, oscillatory means on said rod adapted to be engaged by said spring actuated members to move said rod, and means adjacent said rod to oscillate said oscillatory means to release said rod relative into said spring actuated members.

10. The combination of gear position and shift members, springs, a traveler between said springs adapted to place said springs under tension, electric means for moving said traveler to compress a spring, a switch actuated by the movement of said traveler to control said electric means, and means utilizing the expansive force of a compressed spring to move a gear position and shift member.

11. In a gear shifting device, reciprocable gear position and shifting members, a prime mover for said members, comprising an electrically driven reciprocable traveler, a spring placed under compression by movement of said traveler, in either direction, a member abutting said spring adapted to actuate a gear position and shifting member, and means holding said actuated member during compression of said spring and adapted to release said member when said traveler has moved a prescribed distance.

12. In a gear shifting device, reciprocable gear position and shifting members, a prime mover for said members comprising an electrically driven reciprocable traveler, a spring placed under compression by movement of said traveler, in either direction, a member abutting said spring adapted to actuate a gear position and shifting member, means holding said actuated member during compression of said spring and adapted to release said member when said traveler has moved a prescribed distance, and means adapted for automatically moving the reciprocated gear position and shifting member out of engagement with the released spring actuated member.

13. In a gear shifting device, a starter motor adapted for a starting mechanism, a prime mover adapted to be operated by said starter motor, gear shifting members, and spring actuated means tensioned by said prime mover and adapted for moving said gear shifting members.

14. In a gear shifting device, a starter motor adapted for a starting mechanism, a prime mover adapted to be operated by said starter motor, gear shifting members, spring actuated means adapted for moving said gear shifting members, and electro-mechanical means controlled by said prime mover to govern the tensioning of said spring means.

15. In a gear shifting device, a starter motor adapted for a starting mechanism, a prime motor adapted to be operated by said starter motor, gear shifting members, a selector for said gear shifting members, spring actuated means tensioned by said prime mover adapted for moving said members, and means in connection with said selector and said prime mover controlling the operation of said starter motor.

16. The combination of a starter motor, a change speed gear transmission mechanism, a casing between said transmission mechanism and said starter motor, springs in said casing adapted to have the expansive force thereof make gear changes in said transmission mechanism, and means in said casing operated by said starter motor adapted to place said springs under compression.

17. The combination of a starter motor, a change speed gear transmission mechanism, a casing between said transmission mechanism and said starter motor, gear shifting members in said casing adapted for shifting gears of said transmission mechanism, springs in said casing adapted to have the expansive force thereof actuate said gear shifting members, means in said casing operated by said starter motor adapted to place said springs under compression, and a combined selecting and controlling device for said gear shifting members and said starter motor.

18. The combination of a change speed transmission mechanism, a casing adjacent said transmission mechanism, springs in said casing adapted to have the expansive force thereof make gear changes in said transmission mechanism, and a prime mover extending into said casing adapted to place said springs under compression.

19. The combination of a change speed transmission mechanism, a casing adjacent said transmission mechanism, gear shifting members in said casing extending to the transmission mechanism for shifting gears thereof, springs in said casing adapted to have the expansive force thereof move said gear shifting members to make gear changes in said transmission mechanism, a prime mover extending into said casing adapted to place said springs under compression, and a combined selecting and controlling device for said gear shifting members and said prime mover.

20. The combination of a starter motor, an engine clutch, a transmission mechanism, a casing, gear shifting members in said casing adapted for making gear changes in said transmission mechanism, springs in said casing adapted to have the expansive force thereof actuate said gear shifting members, and a prime mover in said casing adapted to place said springs under compression and throw out said engine clutch during the shifting of transmission gears.

21. The combination of a starter motor, an engine clutch, a transmission mechanism, a casing, gear shifting members in said casing adapted for making gear changes in said transmission mechanism, springs in said casing adapted to have the expansive force thereof actuate said gear shifting members, a prime mover in said casing adapted to place said springs under compression and to throw out said engine clutch during the shifting of transmission gears, a dash pot governing the movement of said clutch by said prime mover, and a combined controlling device for said prime mover and dash pot.

22. In an electric gear shifting device for automobiles, gear shifting members, springs adapted to have the expansive force thereof operate said gear shifting members, electrical means for compressing said springs, a combined selector for said gear shifting members and said electrical means, and a master switch controlling the operation of said electrical means.

23. Means adapted to throw out a clutch and shift gears, comprising a member adapted to be compressed and have the expansive force thereof utilized at a predetermined time for shifting gears, an electro-mechanical means for throwing out the clutch and placing the member under compression.

24. Means adapted to throw out a clutch and shift gears, comprising opposed members and electro-mechanical means adapted for simultaneously throwing out the clutch and placing either member under compression so that the expansive force of either member may be used for gear shifting purposes.

25. In a clutch control, a gear shifting device, expansive means, means for simultaneously throwing out a clutch and placing said expansive means under compression, and means in connection with the last mentioned means automatically releasing the expansive force after a predetermined degree of compression is obtained.

26. The combination of a clutch, a starter motor adapted for a starting mechanism, gear shifting members, spring actuated means for moving said gear shifting members, and a prime mover adapted to be operated by said starter motor and simultaneously throw out said clutch, and tension said spring actuated means.

In testimony whereof I affix my signature in the presence of two witnesses.

ARTHUR M. BATSNER.

Witnesses:
MILDRED SCHUERMAN,
T. K. SCMUCK.